United States Patent [19]

Byström et al.

[11] Patent Number: 4,646,010
[45] Date of Patent: Feb. 24, 1987

[54] FLUIDICALLY MOUNTED APPARATUS FOR MEASURING THE TORQUE IN A SHAFT

[75] Inventors: Karl Byström, Sollentuna; Erik Karlsson, Vällingby; Gunnar Kihlberg, Sollentuna; Henry Reit, Stockholm, all of Sweden

[73] Assignee: Jungner Marine AB, Solna, Sweden

[21] Appl. No.: 709,688

[22] PCT Filed: Jun. 20, 1984

[86] PCT No.: PCT/SE84/00233
§ 371 Date: Feb. 22, 1985
§ 102(e) Date: Feb. 22, 1985

[87] PCT Pub. No.: WO85/00220
PCT Pub. Date: Jan. 17, 1985

[51] Int. Cl.$^4$ ............................. G01L 3/10; G01B 7/30
[52] U.S. Cl. ........................... 324/208; 73/862.34; 340/870.31
[58] Field of Search ............... 324/207, 208, 209, 173, 324/174, 200; 73/862.33, 862.34, 862.36; 340/870.31, 870.32

[56] References Cited

U.S. PATENT DOCUMENTS 3,243,692  3/1966  Heissmeier et al. ............. 324/174 X
3,505,865  4/1970  Kihlberg et al. .................. 73/862.34
3,783,248  1/1974  Sugden ............................ 324/174 X
4,083,423  4/1978  Williams et al. ................. 324/174 X
4,107,601  8/1978  Barmeier et al. .................... 324/173

FOREIGN PATENT DOCUMENTS 0637674 12/1978 U.S.S.R. ............................. 324/174

Primary Examiner—Gerard R. Strecker
Attorney, Agent, or Firm—Oblon, Fisher, Spivak, McClelland & Maier

[57] ABSTRACT

A transmitter arrangement for a rotatable shaft (1) includes a rotor (2) in the form of a cog-wheel arrangement (7,8) which is to be mounted on the shaft (1). A stator (6a–6d) is rigid relative to the rotatable shaft (1), and is adapted for connection to an AC voltage source for generating electrical signals which depend on the angular position of the rotor (1) relative to the stator (6a–6d). The cog-wheel device is composed of a folded cog band (7) of magnetic material which is attached to a carrying band (8). The carrying band (8) is provided with means (11,12,13) for attachment of the cog-wheel device around the shaft (1) and is provided with radially extending tabs (9) on the surface facing the shaft. The tabs (9) guide a hose (10) which can be filled with fluid and which is insertable between the tabs (9). At filling with fluid, the hose (10) expands both around the periphery of the shaft (1) and towards the carrying band (8) for fixed mounting and centering of the cog-wheel device on the shaft (1).

6 Claims, 7 Drawing Figures

FLUIDICALLY MOUNTED APPARATUS FOR MEASURING THE TORQUE IN A SHAFT

FIELD OF THE INVENTION

The present invention relates to a transmitter arrangement for a rotatable shaft comprising a rotor in the form of a cog-wheel device which is to be mounted on the shaft and a stator which is rigid relative to the rotatable shaft and is adapted for connection to an AC voltage to generate electrical signals which depend on the angular position of the rotor relative to the stator.

BACKGROUND OF THE INVENTION

An arrangement of this kind is disclosed in for instance U.S. Pat. No. 3,505,865 and relates to a device for measuring angular differences between two toothed wheels which are mounted on a rotatable shaft. Such an arrangement comprises two inductive transmitters, each of which cooperates with a toothed wheel to generate electrical signals which depend on the angular position in space of the toothed cog-wheel. A differentiating device is connected to the two transmitters and is adapted to measure the difference between two signals generated by the transmitter. The measuring technique which is accomplished through the system according to the just mentioned U.S. specification is consequently utilized in the transmitter arrangement according to the present invention.

In the system according to the above patent, the two wheels are massive and are mounted on the shaft by means of supporting rings which have to be carefully centered and fixed directly on the shaft by means of jaws. Such an installation is rather complicated and time-consuming, which has caused problems specifically if the installation has to be carried out on a ship's propeller shaft during the short time period when the ship is staying in harbour for loading or unloading of cargo. Consequently, demands have been made for an improved installation of the toothed wheels which can be carried out more rapidly and which does not unnecessarily prolong the ship's stay in harbour.

OBJECT OF THE INVENTION

The object of the present invention is to provide a transmitter arrangement for a rotatable shaft which has low weight and enables easy mounting and centering on the shaft and consequently can be installed in a very short time.

SUMMARY OF THE INVENTION

A transmitter arrangement according to the invention is substantially characterized in that the cog-wheel device comprises a folded cog band of magnetic material which is attached to a carrying band provided with means for assembling the cog band device around the shaft. The carrying band is provided with radially extending guide members on the surface facing the shaft, and the guide members are arranged for axial guidance of a hose to be filled with a fluid. The hose is insertable between the guide members. When the hose is filled with the fluid, the hose expands both around the periphery of the shaft and against the carrying band to fix and centre the cog band device on the shaft.

BRIEF DESCRIPTION OF THE DRAWINGS

An embodiment of the invention will now be described in detail with reference to the accompanying drawings.

DETAILED DESCRIPTION OF THE PRESENTLY PREFERRED EMBODIMENT

Figure 1:
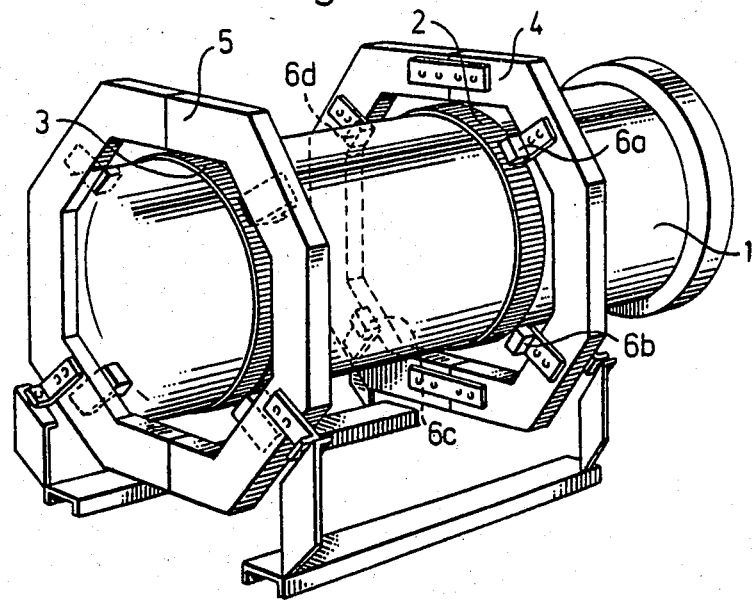
FIG. 1 is a perspective view of a transmitter arrangement according to the invention to measure angular differences between two cog wheels.

A transmitter arrangement according to the invention can be used for measuring torque on a rotatable shaft 1. The arrangement comprises a rotor which, according to FIG. 1, comprises two toothed wheels in the form of cog-bands 2 and 3 which are mounted on the rotatable shaft 1. Two stators 4 and 5 are rigid relative to the rotatable shaft 1 and are adapted for connection to an AC voltage source for generating electrical signals which depend on the angular position of each cog-band 2, 3 relative to the associated stator 4, 5 as described in the above-mentioned U.S. Pat. No. 3,505,865. Each stator 4, 5 comprises four stator segments 6a–6d which are arranged with the same angular spacing around the periphery of the rotatable shaft 1 and are disposed just opposite to the cog-bands 2, 3.

Figure 2:
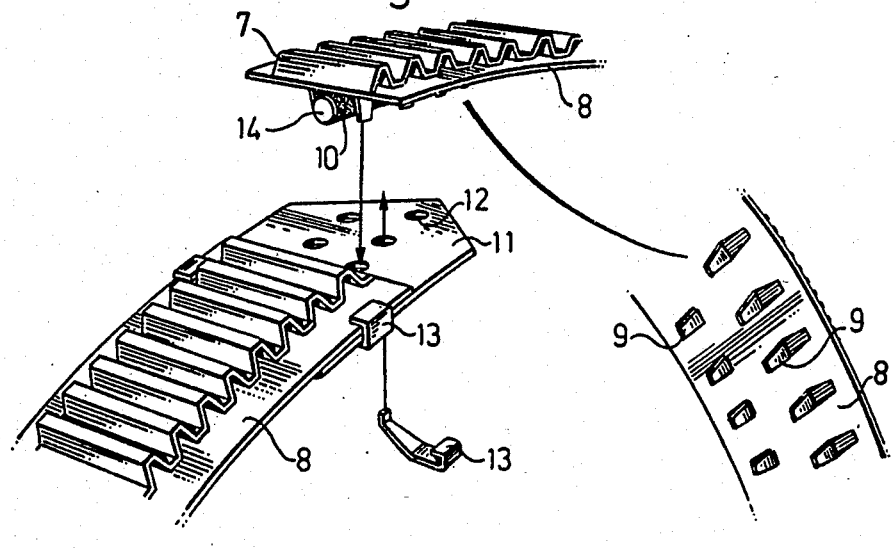
FIG. 2 is a perspective view of details in a cog-wheel device according to the invention.

The design of the cog-wheel device is shown on FIG. 2 and comprises a folded cog band 7 of magnetic material which is mounted on a carrying band 8. The cog band 7 is preferably made of high quality magnetic material, and the carrying band 8 is suitably made of a flexible material with high strength and toughness which makes it possible to shear the band. The carrying band 8 is provided with radially extending tabs 9 on the surface facing the rotatable shaft 1. The tabs 9 are stamped out of the carrying band 8 and are consequently formed in one piece with the carrying band 8. The tabs 9 are stamped in two rows in the carrying band 8. A flexible hose 10 is inserted between the two rows of radially extending tabs 9. The two rows of tabs 9 are consequently intended to axially guide the hose 10 and to prevent the hose 10 from extending outside the carrying band 8 at the mounting around the shaft 1. The hose 10 is to be filled with gas or liquid, and a simple method is to fill the hose 10 with air by means of a common bicycle pump (not shown). When the hose 10 is filled with air, it will expand both around the periphery of the shaft 1 and against the carrying band 8, whereby the cog-wheel device will be fixedly mounted and securely centered on the shaft 1. FIG. 2 shows a position of the carrying band 8 when it has been arranged around the shaft 1 and its ends are to be assembled. For this purpose, a joint plate 11 is provided with holes 12 corresponding to the tabs 9 formed in the inner surface of the carrying band 8. The joint plate 11 is fixed to one end of the carrying band 8 by means of clips 13. In FIG. 2, the position of the other end of the carrying band 8 is shown immediately before it has been brought down against the joint plate 11 and the tabs 9 have been fitted in the corresponding holes 12.

Figure 3:
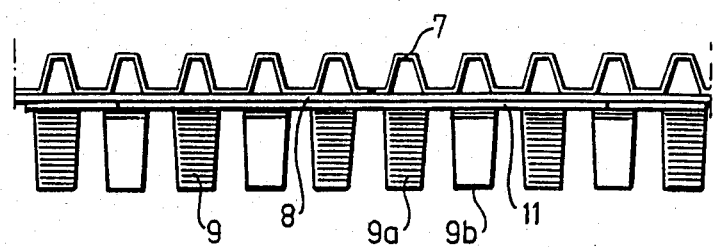
FIG. 3 is a side view of the ends of a carrying band according to the invention.
Figure 4:
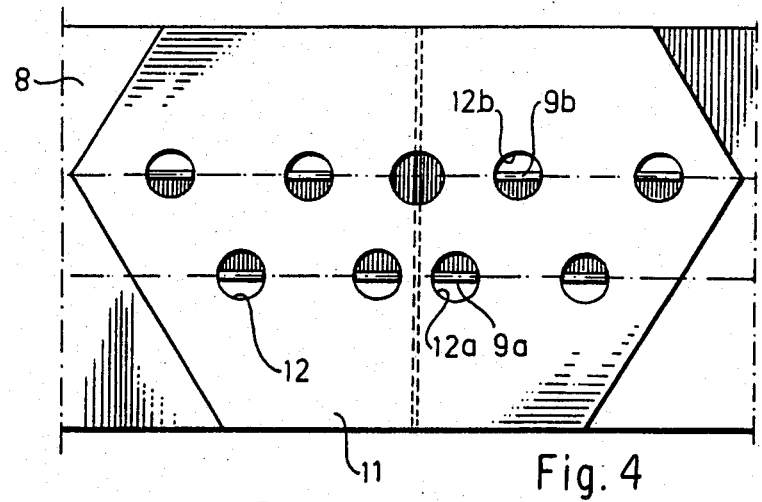
FIG. 4 is a plan view from below of the ends of a carrying band according to the invention.

FIG. 4 is a plan view of the joint plate 11 from beneath, and FIG. 3 is a lateral view of the joint between the carrying band 8 and the ends of the cog-band 7. As previously mentioned, the joint plate 11 is provided with holes 12 corresponding to the tabs 9 on the inner side of the carrying band 8. The holes 12 are disposed in such a way that only a cog band 7 with an odd number of cogs has tabs 9 which correspond to the hole locations in the joint plate 11. This is due to the fact that, in the manufacture of the cog wheel arrangement, the cog band 7 and the carrying band 8 are accurately attached to one another so that each cog will exactly correspond to an inwardly projecting tab 9. Each cog band 7 with an odd number of cogs will thus be terminated with an inwardly projecting tab 9a in the lower row of tabs which directly corresponds to a hole 12a in the joint plate 11 in the embodiment shown in the Figure. If the number of cogs had been even, the cog band would have been terminated with a cog which corresponds to a tab 9b in the upper row of tabs, which thus would have fit into a corresponding hole 12b. In this case, however, the joint plate 11 will not permit the ends of the cog band 7 to be assembled. This measure will therefore prevent that the cog band 7 by mistake is cut off with an even number of cogs. By choosing an odd number of cogs, it is possible to align the stator segments 6a-6d exactly relative to the cog bands 2, 3.

If the cog bands 2, 3 always have an odd number of cogs and the four stator segments 6a-6d are positioned around the shaft 1 with an angular spacing of 90°, the blocks will generate output voltages which are separated by an electrical angle which corresponds to ¼ of the tooth pitch. It is common knowledge that the difference of ¼ tooth pitch corresponds to an electrical angle of 90°. The segments will thus generate voltages with the following electrical angles:

| Segment | 6a | 6b | 6c | 6d |
| --- | --- | --- | --- | --- |
| Angle | $\beta$ | $\beta + 90°$ | $\beta + 180°$ | $\beta + 270°$ |

The voltage from the segments 6a and 6c can be combined to a voltage which is proportional to $\sin \beta$, and the voltage from the segments 6b and 6d can be combined to a voltage proportional to $\cos \beta$.

The above is applicable for all odd numbers.

Thus, the shortening of the carrying band should always be made in steps of two cogs if the cog number has to be odd. This means that a certain clearance can occur between the inner diameter of the carrying band 8 and the outer diameter of the shaft 1. The gap between the shaft 1 and the ends of the tabs 9 can in practice be about 2 mm if no other measures are taken. A gap of 2 mm can be difficult to bridge for instance in a glueing operation. In order to decrease the gap to a size of about 0.5 mm, the lengths of the tabs are shortened by shearing.

Figure 5:
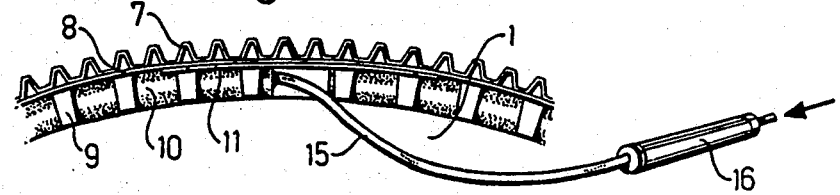
FIGS. 5-7 show different steps in mounting the cog-wheel device according to the invention on a shaft.
Figure 6:
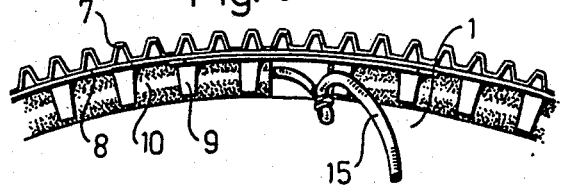
Figure 7:
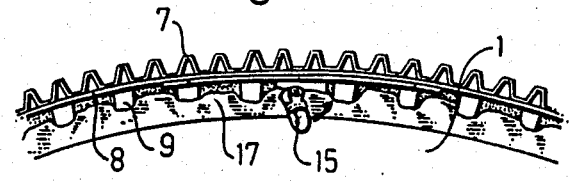

The different steps of assembling the cog-wheel device on a shaft 1 is shown on FIGS. 5-7. The folded cog band 7 is first put around the shaft 1 and is joined in the way described in connection with FIGS. 2-4. One end of the flexible hose 10 is provided with a spigot 14 (see FIG. 2). The other end of the flexible hose 10 is connected to a flexible tube 15 (see FIG. 5) which in its turn is connected to a test section 16 which consists of a hose section which is equal to that inserted between the tabs 9 of the carrying band 8. The test section 16 is meant to indicate the degree of expansion of the flexible hose 10 under the carrying band 8, since the latter is not visible and therefore cannot be controlled by the person filling the hose 10 with air.

FIG. 5 shows that the tabs 9 have such height that they are disposed around the periphery of the shaft 1 without considerable gap. The end of the test section 16 is connected to a pressure source, which can be an ordinary bicycle pump. The hose 10 is filled to a pressure which permits a certain axial movement of the carrying band 8 on the shaft 1. The carrying band 8 is then displaced under the stator segments 6a-6d and centered very accurately so that one end of the cog band 7 will be completely aligned with one edge of a stator segment. When this alignment has been carried out and the two bands 7, 8 have been placed in correct position on the shaft 1 relative to the two stators 4 and 5, the pressure in the hose 10 is increased, whereby the cog band is immovably fixed around the shaft 1. After a time, the air pressure in the hose 10 is tested in order to establish that it has not decreased. The flexible tube 15 is then tied up in the way shown in FIG. 6, and a curing glue 17 is applied to the hose 10 on both sides of the flexible tube 15 so that the tabs 9 will be embedded in the glue 17 in the way shown in FIG. 7. The end of the flexible tube 15 is then cut off, and the tied-up end is put under the carrying band 8 where it is fixed. Applying the glue 17 outside the hose 10 has the effect that, if an air leakage occurs in the hose 10, the glue 17 will be compressed between the shaft 1 and the carrying band 8 which will further increase the strength of the glue joint.

We claim:
1. Apparatus for measuring the torque in a rotatable shaft, said apparatus comprising:
 (a) two rotors which, in use, are mounted on and axially spaced on the rotatable shaft, each one of said two rotors comprising:
  (i) a carrying band which, in use, circumferentially surrounds the rotatable shaft;
  (ii) a folded cog band which, in use, circumferentially surrounds said carrying band, said folded cog band being made of magnetic material, being attached to said carrying band, and comprising a plurality of uniformly spaced cogs;
  (iii) means for connecting the ends of said carrying band to form a ring surrounding the rotatable shaft;
  (iv) two axially spaced rows of guide members extending radially inwardly from the radially inward surface of said carrying band;
  (v) an inflatable hose disposed between said two axially spaced rows of guide members; and
  (vi) means for inflating said inflatable hose with a fluid to thereby expand said inflatable hose both against the external circumference of the rotatable shaft and against the internal circumference of said carrying band, thereby fixing said folded cog band on the rotatable shaft, and
 (b) two stators axially spaced relative to the rotatable shaft, each one of said two stators being fixed relative to said rotatable shaft and, in use, being located radially outwardly of and surrounding a corresponding one of said two rotors, each one of said two stators comprising means for generating electrical signals which depend on the angular position of the corresponding one of said two rotors relative to said each one of said two stators.

2. Apparatus as recited in claim 1 wherein each one of said guide members comprises a plurality of tabs stamped out of said carrying band, said tabs being sized and shaped such that the inner diameter of said carrying band in its assembled position around the rotatable shaft is substantially the same as the diameter of the rotatable shaft.

3. Apparatus as recited in claim 2 wherein:
(a) said plurality of tabs are uniformly spaced in the circumferential direction around the rotatable shaft;
(b) said plurality of uniformly spaced cogs and said plurality of uniformly spaced tabs in each one of said two rotors have the same pitch; and
(c) each one of said folded cog bands is positioned on the associated one of said carrying bands such that the pitch distances coincide along the periphery.

4. Apparatus as recited in claim 2 wherein:
(a) said plurality of tabs are uniformly spaced in the circumferential direction around the rotatable shaft;
(b) said plurality of uniformly spaced cogs have a pitch that is half the pitch of said plurality of uniformly spaced tabs in each one of said two rotors, whereby the distance between adjacent tabs in the same row is two cog pitches; and
(c) each one of said folded cog bands is positioned on the associated one of said carrying bands such that the pitch distances coincide along the periphery.

5. Apparatus as recited in claim 1 wherein each one of said folded cog bands has an odd number of cogs.

6. Apparatus as recited in claim 1 wherein each one of said two stators comprises four segments, each one of which extends for 90° around the rotatable shaft.

* * * * *